June 19, 1928.
T. S. SMITH
1,674,071
PULLEY BLOCK
Filed July 22, 1926
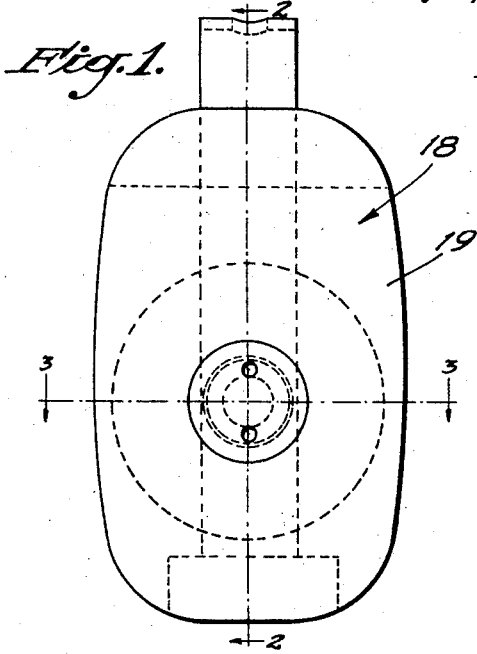
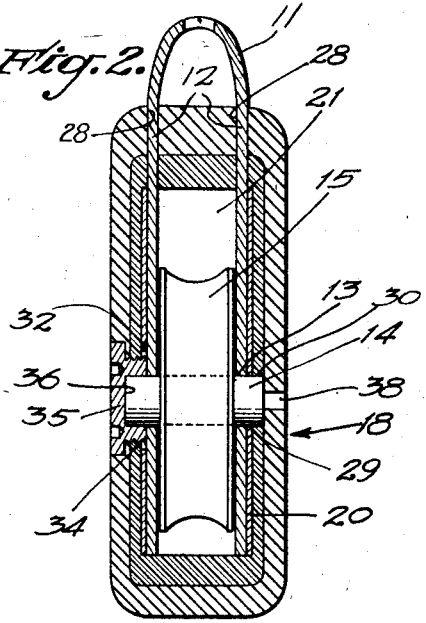
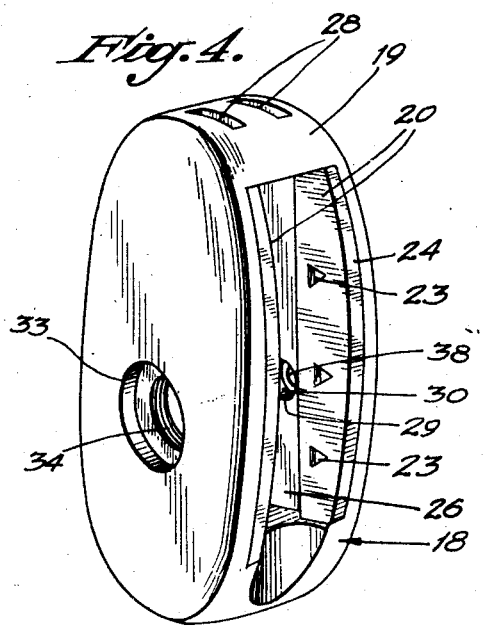
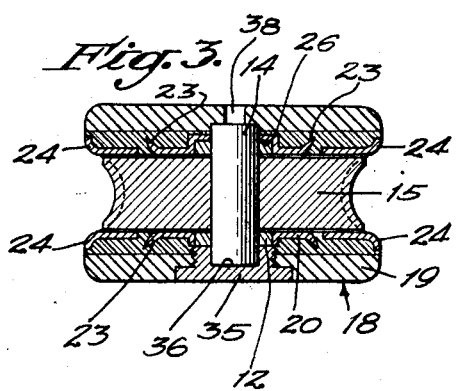
INVENTOR:
THOMAS S. SMITH,
BY
Floyd H. Harris
ATTORNEY.

Patented June 19, 1928.

1,674,071

UNITED STATES PATENT OFFICE.

THOMAS S. SMITH, OF WILMINGTON, CALIFORNIA.

PULLEY BLOCK.

Application filed July 22, 1926. Serial No. 124,177.

My invention relates to pulley blocks and particularly to a pulley block which is very valuable as a part of rigging on boats. The ordinary pulley block, when it knocks against the mast of a boat, causes blemishes which are difficult to remove and which must be removed by scraping the mast which is quite a laborious task.

It is an object of this invention to provide a pulley block which will not mar the mast or other members of a boat when blown or knocked against it.

The ordinary pulley block makes quite a noise when it knocks against the mast or other part of the boat, and it is an object of this invention to provide a pulley block in which such noise is practically eliminated.

It is necessary to frequently work over and revarnish the ordinary form of pulley block because of the fact that it deteriorates very rapidly due to weathering.

It is an object of this invention to provide a pulley block having a substantially permanent finish and which will require no working over or re-varnishing.

It is an object of this invention to provide a pulley block having a shell of a certain color, this color being permanent and not affected by the weather so that it can be distinguished from other blocks by a person from the deck of a boat.

It is a still further object of the invention to provide a pulley block having a one-piece resilient shell.

It is also an object of the invention to provide a pulley block having reenforcing and rub plates for reenforcing and protecting the resilient shell.

Other objects and advantages of the invention will be set forth hereinafter.

Referring to the drawing in which I illustrate a preferred form of the invention, Fig. 1 is an elevational view of a pulley block incorporating the features of the invention.

Fig. 2 is a vertical section taken on the line 2—2 of Fig. 1.

Fig. 3 is a horizontal section taken on the line 3—3 of Fig. 1.

Fig. 4 is a perspective view of the shell of the pulley block.

Referring in detail to the drawing and particularly to Figs. 2 and 3, the numeral 11 represents a yoke having a pair of substantially parallel extending legs 12. Near the lower ends of the legs 12 are openings 13 through which a bearing pin 14 extends. Rotatably supported on the bearing pin 14 between the legs 12 is a pulley 15.

Surrounding the bearing pin 14, the pulley 15 and all except the upper part of the yoke 11 is a shell 18 which includes certain important features of this invention. The shell 18 consists of a one-piece rubber body 19 and a pair of wear plates 20. The body 19 has a large opening 21 formed therethrough, on the opposite sides of which the wear plates 20 are placed. Referring to Fig. 3, the wear plates 20 have tongues 23 bent therefrom which serve as a means for tying them to the walls of the body 19. The opposite sides of the wear plates 20 are rounded outward as indicated at 24. Vertical channels 26 are formed at the central parts of the wear plates 20, in which channels 26 the lower ends of the legs 12 are received. The legs 12 extend into the opening 21 and the shell 18, through holes 28 provided in the upper part thereof.

The right wear plate 20 of Fig. 2 has an opening 29, and the right part of the body 19 has a cavity 30 into which one end of the bearing pin 14 extends. The left wear plate 20 of Fig. 2 has an opening 32 which is considerably larger than the bearing pin 14. The left part of the body 19 has a large opening 33, the inner part of which is smaller in diameter than the outer and is threaded as indicated at 34. A retainer bushing 35 is adapted to be secured into the opening 33. The inner part of the retainer bushing 35 has a socket 36, into which the left end (Fig. 2) of the bearing pin 14 extends. The bearing pin 14 may be removed from place by first removing the retainer bushing 36. An opening 38 is provided in the right wall of the body adjacent to the cavity 30, through which opening a rod may be extended for forcing the bearing pin 14 from place.

The shell 18 includes the important features of the invention. The body 19 of the shell, as previously pointed out, is made of one piece and is formed of rubber. The body 19 is molded in the form shown and the wear plates 20 are secured in place at the time the body 19 is molded. The body 19 may be made of hard or soft rubber. In the event that soft rubber is used, the plates 20 which at all times serve the purpose of preventing the sides of the body from being frictionally worn by a rope passing around the pulley 15, will also serve as reenforcing means for the body 19. If desired, the inner part of the body 19 may be made of a comparatively hard rubber, whereas the outer part may be made of a softer rubber.

The shell 18 is practically indestructible. Rubber is not deteriorated by the weather and therefore no refinishing, such as is necessary with the common pulley block, is required. The shell 18 may be provided with a smooth finish, which smooth finish is permanent. The shell 18, since it may have a soft outer surface, will not mar the mast or other parts of the boat when the pulley block is knocked against them by the wind or the swaying of the boat. Also, there will be no noticeable noise by reason of the cushioning effect of the soft rubber of the outer surface of the shell 18.

The rubber from which the body 19 is formed may be colored before it is molded. It will be seen that for this reason the color of the shell of the pulley block is permanent and requires no painting. Since there is no deterioration of the body 19, the color of the shell will be retained.

Not only will the shell 18 have a much longer life than the shell of the ordinary pulley block, but it will be much cheaper in first cost. The channels 26 provided by the wear plates 20 are important as a means of centralizing the legs 12 of the yoke 11. The retainer bushing 36 is important to the invention because of the fact that it provides a means whereby the bearing pin 14 may be easily removed and the block thus quickly dismantled.

The important features of the shell of the invention evolve primarily from the use of the rubber body 19.

I claim as my invention:

1. A pulley block comprising: a yoke having a pair of legs; a bearing pin supported by said legs; a sheave carried by said bearing pin between said legs; a rubber body, said body having an opening in which said legs, said bearing pin and said sheave are located; wear plates secured to said body in said opening on opposite sides of said sheave; and a retainer bushing detachably secured to said body for retaining said bearing pin in place.

2. A pulley block comprising: a yoke having a pair of legs; a bearing pin supported by said legs; a sheave carried by said bearing pin between said legs; a rubber body, said body having an opening in which said legs, said bearing pin and said sheave are located; wear plates secured to said body in said opening on opposite sides of said sheave, there being channels formed in said wear plates in which said legs extend; and a retainer bushing detachably secured to said body for retaining said bearing pin in place.

In testimony whereof, I have hereunto set my hand at Los Angeles, California, this 16th day of July, 1926.

THOMAS S. SMITH.